United States Patent
Maetaki (10) Patent No.: US 8,970,966 B2
(45) Date of Patent: Mar. 3, 2015

(54) OPTICAL SYSTEM AND OPTICAL APPARATUS HAVING THE SAME

(71) Applicant: Canon Kabushiki Kaisha, Tokyo (JP)

(72) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/720,001

(22) Filed: Dec. 19, 2012

(65) Prior Publication Data
US 2013/0169851 A1   Jul. 4, 2013

(30) Foreign Application Priority Data
Dec. 28, 2011   (JP) .................................. 2011-288116

(51) Int. Cl.
*G02B 15/15* (2006.01)
*G02B 15/14* (2006.01)
*H04N 5/225* (2006.01)
*G02B 15/173* (2006.01)
*G02B 9/34* (2006.01)

(52) U.S. Cl.
CPC ............... *G02B 15/14* (2013.01); *H04N 5/225* (2013.01); *G02B 15/173* (2013.01); *G02B 9/34* (2013.01)
USPC ............ 359/677; 359/676; 359/774; 359/794

(58) Field of Classification Search
CPC .. G02B 15/14; G02B 15/173; G02B 13/0045; G02B 9/06; G02B 9/14; G02B 9/58
USPC .......................................... 359/691, 793, 794
See application file for complete search history.

(56) References Cited

U.S. PATENT DOCUMENTS

| | | | | |
|---|---|---|---|---|
| 2,541,484 A | * | 2/1951 | Schade ......................... | 359/780 |
| 5,227,920 A | * | 7/1993 | Shibayama .................... | 359/692 |
| 2008/0285160 A1 | * | 11/2008 | Shyshkin et al. ............. | 359/794 |
| 2011/0310496 A1 | * | 12/2011 | Kubota et al. ................. | 359/794 |
| 2012/0113516 A1 | * | 5/2012 | Kimura .......................... | 359/557 |

FOREIGN PATENT DOCUMENTS

JP   06-337348 A   12/1994

OTHER PUBLICATIONS

Sadahiko Tsuji, "All about Lens Design", Dempa Newspaper Corporation, 2006, pp. 271, 288, and 230.

* cited by examiner

*Primary Examiner* — Scott J Sugarman
*Assistant Examiner* — Daniele Manikeu
(74) *Attorney, Agent, or Firm* — Fitzpatrick, Cella, Harper & Scinto (57) ABSTRACT

An optical system includes, in order from an object side to an image side, a first lens unit of a positive refractive power, an aperture diaphragm, and a second lens unit of a positive refractive power. The first lens unit includes, in order from the object side to the image side, a cemented lens Lp1 made by joining a first lens of a positive refractive power and a second lens of a negative refractive power with each other, and a third lens of a positive refractive power which has a meniscus shape. The predetermined conditions are satisfied.

9 Claims, 5 Drawing Sheets

OPTICAL SYSTEM AND OPTICAL APPARATUS HAVING THE SAME

BACKGROUND OF THE INVENTION

1. Field of the Invention

The present invention relates to an optical system and an optical apparatus having the same. The present invention is suitable, for example, for a digital still camera, a digital video camera, a surveillance camera, a film-based camera, and a projector.

2. Description of the Related Art

As an image pickup optical system for use with an optical apparatus, such as a digital camera and a video camera, there are known a variety of optical systems each having a back focus equal to or longer than a focal length. For example, a wide variety of image pickup optical systems are known such as a double gauss type, a retro focus type, an ortho-meta type, a plasmat type, and a hexanon type.

Sadahiko Tsuji, "All about Lens Design" Dempa Newspaper Corporation, 2006, pp. 271, 288, and 230 (referred to as "Tsuji" hereinafter) discloses an image pickup optical system having a focal length from 28 mm to 50 mm (and half an image pickup angle of view from 23° to 38°). This image pickup optical system is required to have a compact overall size and a high optical performance over the screen. A gauss type image pickup system is known as a compact image pickup optical system having a standard angle of view that approximately meets these requirements. Japanese Patent Laid-Open No. 6-337348 discloses a gauss type image pickup optical system having a short overall lens length which includes, in order from the object side to the image side, a front unit of a positive refractive power, an aperture diaphragm, and a rear unit of a positive refractive power.

The gauss type image pickup optical system usually has an approximately symmetrical lens structure as a whole in which a lens unit of a positive refractive power is arranged on a front (object) side, and a lens unit of a positive refractive power is arranged on a back (image) side. In an attempt to obtain a wider angle of view with this image pickup optical system, it is difficult to maintain long the back focus. On the other hand, in an attempt to maintain long the back focus, a variety of aberrations, in particular a curvature of field, accordingly increases and their corrections become difficult. In addition, the entire optical system comes to have a larger size.

As well as these image pickup optical systems, Tsuji also discloses a plasmat type image pickup optical system including in total six lens units in which the object side is replaced with the image side. This image pickup optical system has an approximately symmetrical lens structure in which a lens unit of a positive refractive power is arranged on the front side, and a lens unit of a positive refractive power is arranged on the rear side, similar to the above gauss type image pickup optical system. Thus, similar problems occur in an attempt to obtain a wider angle of view, as described above.

It is difficult for the image pickup optical systems disclosed by Tsuji to realize both a wider angle of view with a shorter overall lens length because the focal length has an approximately inverse relationship with the overall lens length. In addition, in an attempt to obtain a wider angle of view, it is difficult to maintain long the back focus. Moreover, the image pickup optical systems disclosed by Tsuji correct an aberration or the curvature of field over the entire screen using a swelling spherical aberration curve. According to the corrected image pickup optical system, a focus moving amount increases as an aperture value (F value) increases relative to the focus position at the maximum aperture state.

When the correction is made using the swelling spherical aberration curve, it becomes difficult to form a uniform image plane at peripheral angles of field in the screen. In general, the gauss type image pickup optical system can achieve a compact overall size and a wider angle of view to some extent. However, as a much wider angle of view is sought, a spherical aberration and a curvature of field increase, and it becomes difficult to obtain a high optical performance over the entire screen.

In order to realize a compact size and a wide image pickup angle of view in the gauss type and modified gauss type image pickup optical systems, the well-balanced corrections of the spherical aberration and the curvature of field are important. In order for such an image pickup optical system to obtain a high optical performance over the entire screen, it is important to properly set the lens structure of the approximately symmetrical lens units on the object and image sides of the aperture diaphragm. In particular, the lens structure of the lens unit located on the object side of the aperture diaphragm is important. If this lens structure is improper, it becomes difficult to properly correct the spherical aberration and the curvature of field and to obtain a high optical performance.

SUMMARY OF THE INVENTION

The present invention provides an optical system and an optical apparatus which has a high optical performance, and properly corrected aberrations, such as a spherical aberration and a curvature of field.

An optical system according to the present invention includes, in order from an object side to an image side, a first lens unit of a positive refractive power, an aperture diaphragm, and a second lens unit of a positive refractive power. The first lens unit includes, in order from the object side to the image side, a cemented lens Lp1 made by joining a first lens of a positive refractive power and a second lens of a negative refractive power with each other, and a third lens of a positive refractive power which has a meniscus shape. The following conditional expressions are satisfied:

$$0.030 < (n11 - n12)$$

$$0.20 < (vd11/vd12) < 1.30$$

$$-10.0 < fp1/f < -0.2$$

where n11 and vd11 are a refractive index and an Abbe number of a material of the first lens, and n12 and vd12 are a refractive index and an Abbe number of a material of the second lens, fp1 is a focal length of the cemented lens Lp1, and f is a focal length of an entire optical system.

Further features of the present invention will become apparent from the following description of exemplary embodiments with reference to the attached drawings.

DESCRIPTION OF THE EMBODIMENTS

A description will now be given of an optical system and an optical apparatus having the same according to the present invention. The optical system according to this embodiment includes, in order from the object side to the image side, a first lens unit of a positive refractive power, an aperture diaphragm, a second lens unit of a positive refractive power. The first lens unit includes, in order from the object side to the image side, a cemented lens Lp1 made by joining a first lens of a positive refractive power and a second lens of a negative refractive power with each other, and a third lens of a positive refractive power which has a meniscus shape. The second lens unit includes, in order from the object side to the image side, a cemented lens Lp2 made by joining a fourth lens of a negative refractive power and a fifth lens of a positive refractive power with each other, and a sixth lens of a positive refractive power which has a meniscus shape.

Figure 1A:
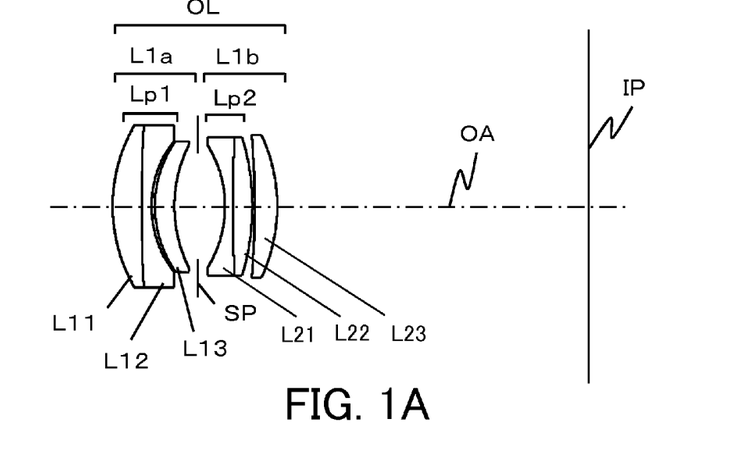
FIGS. 1A and 1B are a sectional view and a longitudinal aberrational diagram in a focus upon an infinitely distant object of an optical system according to a first embodiment.
Figure 1B:
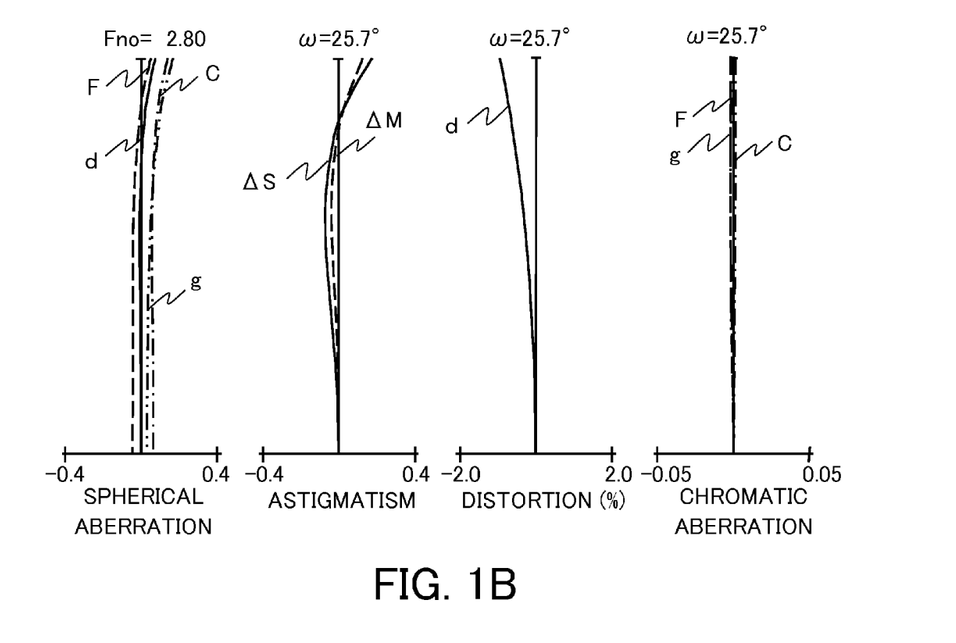
Figure 2A:
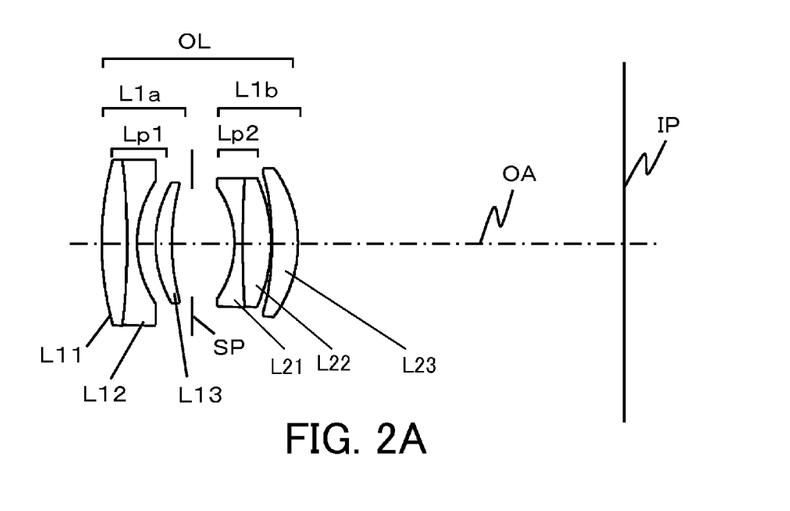
FIGS. 2A and 2B are a sectional view and a longitudinal aberrational diagram in a focus upon an infinitely distant object of an optical system according to a second embodiment.
Figure 2B:
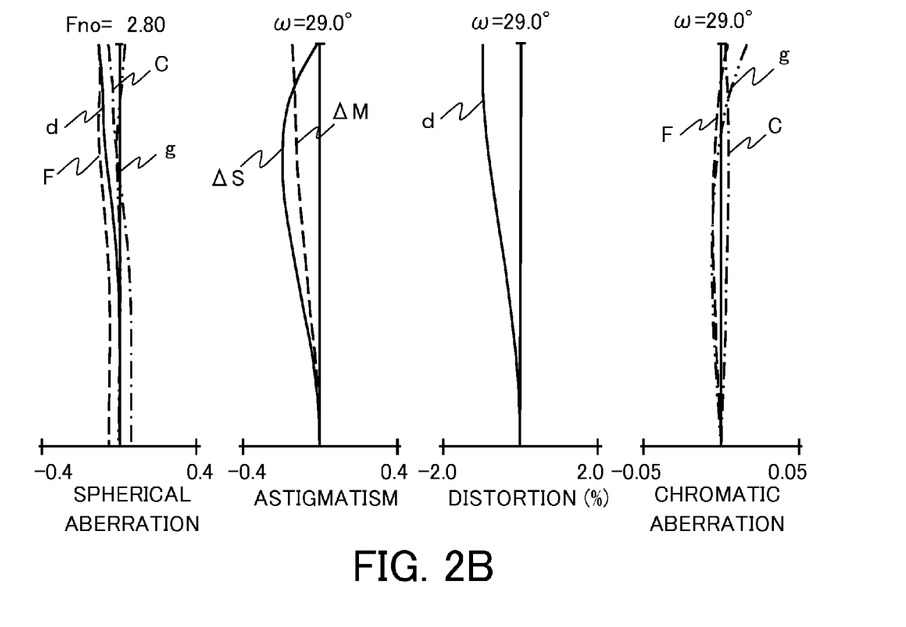

FIG. 1A is a lens sectional view of an optical system according to a first embodiment of the present invention. FIG. 1B is a longitudinal aberrational diagram in a focus upon the infinite object in the optical system according to the first embodiment. FIG. 2A is a lens sectional view of an optical system according to a second embodiment of the present invention. FIG. 2B is a longitudinal aberrational diagram in a focus upon the infinite object in the optical system according to the second embodiment.

Figure 3A:
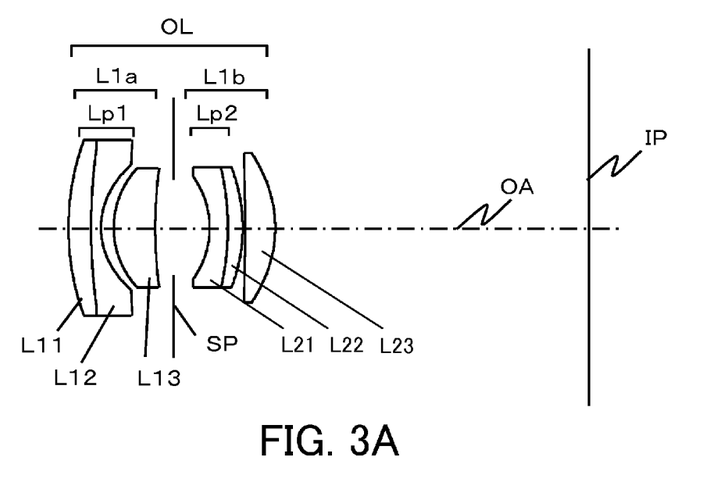
FIGS. 3A and 3B are a sectional view and a longitudinal aberrational diagram in a focus upon an infinitely distant object of an optical system according to a third embodiment.
Figure 3B:
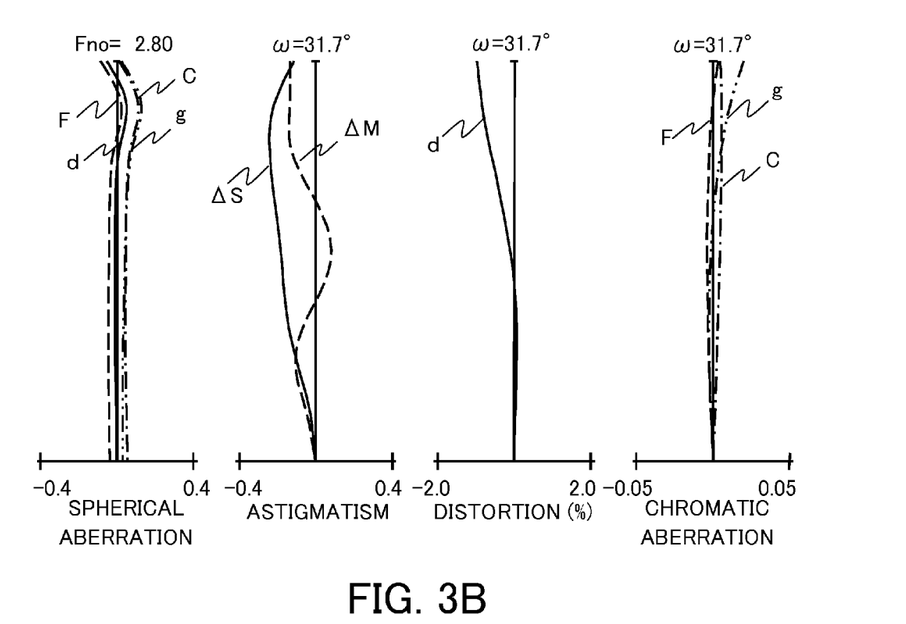
Figure 4A:
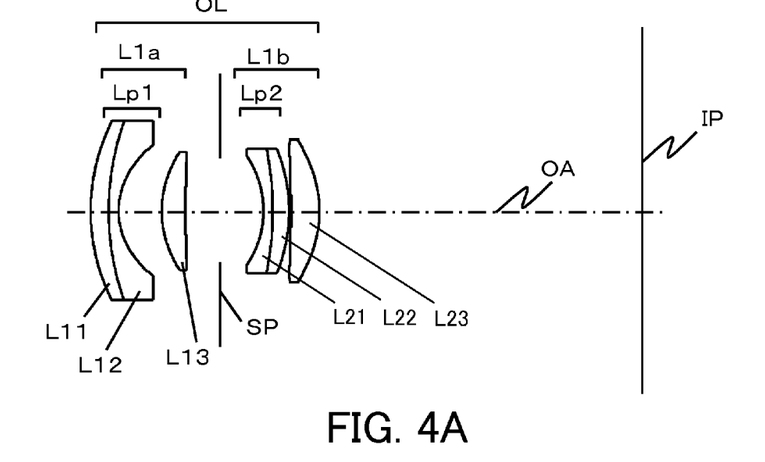
FIGS. 4A and 4B are a sectional view and a longitudinal aberrational diagram in a focus upon an infinitely distant object of an optical system according to a fourth embodiment.
Figure 4B:
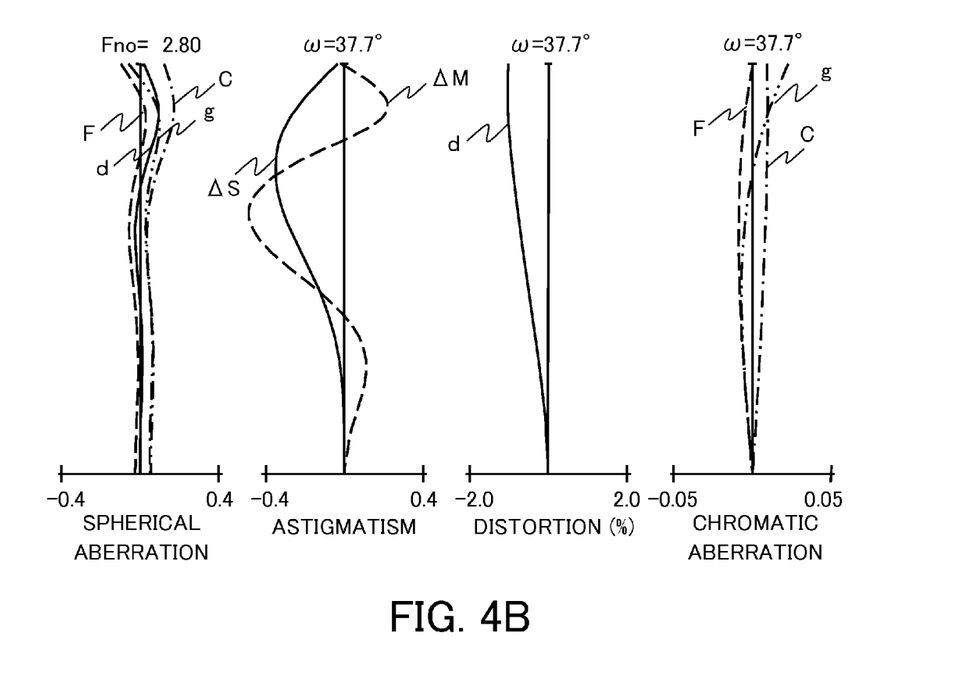
Figure 5:
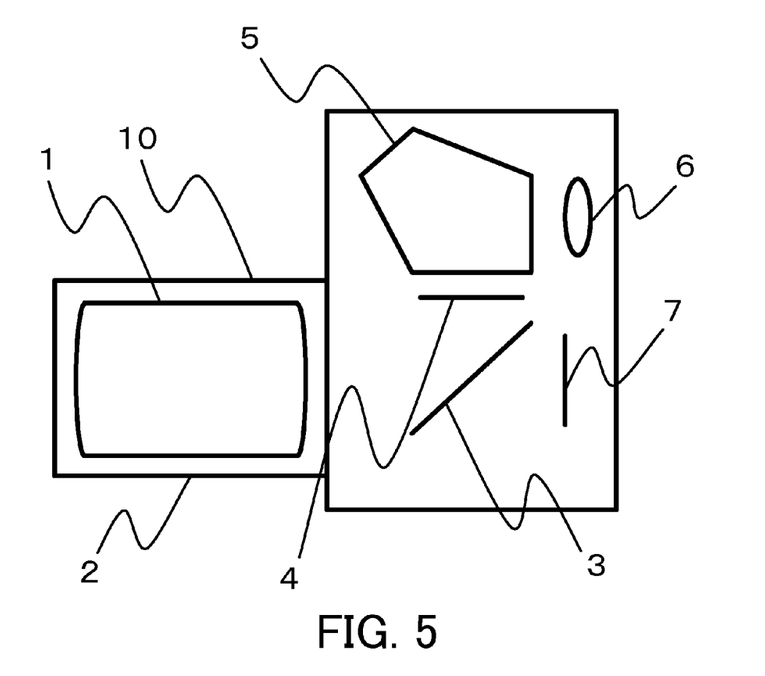
FIG. 5 is a schematic diagram of a principal part of an image pickup apparatus (optical apparatus) according to the present invention.

FIG. 3A is a lens sectional view of an optical system according to a third embodiment of the present invention. FIG. 3B is a longitudinal aberrational diagram in a focus upon the infinite object in the optical system according to the third embodiment. FIG. 4A is a lens sectional view of an optical system according to a fourth embodiment of the present invention. FIG. 4B is a longitudinal aberrational diagram in a focus upon the infinite object in the optical system according to the fourth embodiment. FIG. 5 is a schematic view of principal part of an optical apparatus according to the present invention.

In the lens sectional view, the left side is the object side (front side or enlarged side) and the right side is the image side (rear side or reduction side). "OL" denotes an optical system. "IP" denotes an image plane, on which an image pickup surface of an image sensor (photoelectric conversion element), such as a CCD and a CMOS sensor, is placed for an image pickup optical system in a video camera and a digital still camera, or a film surface is placed for an image pickup optical system in a film-based camera. "OA" denotes an optical axis of the optical system OL.

In the aberrational diagram, "d" denotes the d-line, "g" denotes the g-line, "C" denotes the C-line, "F" denotes the F-line. "ΔM" denotes a meridional image plane of the d-line, and "ΔS" denotes a sagittal image plane of the d-line. The distortion is expressed by the d-line. "Fno" denotes an F number. "ω" denotes half an image pickup angle of view.

The optical system of each embodiment includes, in order from the object side to the image side, a first lens unit L1a of a positive refractive power, an aperture diaphragm SP arranged on the image side of the first lens unit L1a, and a second lens unit L1b of a positive refractive power arranged on the image side of the aperture diaphragm SP. The first lens unit L1a includes, in order from the object side to the image side, a cemented lens Lp1 made by joining a positive first lens L11 and a negative second lens L12 with each other, and a positive third lens L13 which has a meniscus shape.

Assume that the material of the first lens L11 has a refractive index n11 and an Abbe number vd11, and that the material of the second lens L12 has a refractive index n12 and an Abbe number vd12. In addition, assume that the cemented lens Lp1 has a focal length fp1, and the overall optical system OL has a focal length f:

Then, the following conditional expressions are satisfied:

$$0.030 < (n11-n12) \tag{1}$$

$$0.20 < (vd11/vd12) < 1.30 \tag{2}$$

$$-10.0 < fp1/f < -0.2 \tag{3}$$

A description will now be given of a technical meaning of each conditional expression.

The conditional expression (1) relates to a refractive index difference between the material of the positive first lens L11 and the material of the negative second lens L12 in the cemented lens Lp1 in the first lens L1a. The refractive index of the material of the positive first lens L11 is set higher than that of the negative second lens L12.

When the conditional expression (1) is satisfied, it is easy to maintain small the Petzval sum of the entire optical system and the image plane characteristic can be properly corrected even in the optical system that has an angle of view slightly wider than the standard angle of view. If the value is lower than the lower limit of the conditional expression (1), it becomes difficult to properly correct the image plane characteristic (curvature of field).

The conditional expression (2) relates to Abbe numbers of the material of the positive first lens L11 and the material of the negative second lens L12 in the cemented lens Lp1 in the first lens L1a. In the optical system of each embodiment, the Abbe numbers of the materials of the positive first lens L11 and the negative second lens L12 are set close to each other so that the conditional expression (2) can be satisfied. When the ratio of the Abbe number is set to the proper range, the curvature of the cemented lens surface is maintained proper and the spherical aberration can be properly corrected. Since the negative second lens L12 can be provided with a refractive index to some degree, the Petzval sum can be restrained and the image plane characteristic can be maintained proper.

If the value is lower than the lower limit of the conditional expression (2), the cemented lens surface needs a stronger light convergence operation and it becomes consequently difficult to properly correct the spherical aberration. If the value is higher than the upper limit of the conditional expression (2), the cemented lens surface needs a stronger light divergence operation and it becomes difficult to properly correct the spherical aberration.

The conditional expression (3) relates to a refractive power of the cemented lens Lp1 in the first lens unit L1a. It is expressed by a value normalized by dividing the focal length of the cemented lens Lp1 by the focal length of the entire optical system. The cemented lens Lp1 may have a negative synthetic focal length, and a refractive power that is not excessively strong. As the synthetic focal length of the cemented lens Lp1 approaches to a positive value, the lens unit having a positive refractive power on the object side in the optical system becomes stronger and it becomes difficult to maintain a predetermined amount of back focus of the entire optical system.

As the negative refractive power of the cemented lens Lp1 becomes stronger, it becomes easy to maintain the predetermined amount of back focus but it becomes difficult to make compact the optical system unless the rear lens unit has a stronger positive refractive power in the optical system. However, in this case, it becomes difficult to maintain proper the optical performance of the optical system. In other words, as the negative refractive power of the cemented lens Lp1 is made stronger, it becomes difficult to make compact the optical system and to obtain a high optical performance.

If the value is lower than the lower limit of the conditional expression (3), the negative refractive power of the cemented lens Lp1 becomes weaker and approaches to a positive value, and it becomes difficult to maintain a predetermined amount of back focus. If the value is higher than the upper limit in the conditional expression (3), the negative refractive power of the cemented lens Lp1 becomes stronger, and it becomes difficult to make compact the optical system and to obtain a high optical performance. The conditional expression (3) is necessary for a compact and high performance optical system. The conditional expressions (1) to (3) may have the following ranges:

$$0.050 < (n11-n12) < 0.350 \quad (1a)$$

$$0.40 < (vd11/vd12) < 1.30 \quad (2a)$$

$$8.0 < fp1/f < -0.4 \quad (3a)$$

The conditional expressions (1a) to (3a) may have the following ranges:

$$0.070 < (n11-n12) < 0.340 \quad (1b)$$

$$0.60 < (vd11/vd12) < 1.20 \quad (2b)$$

$$-7.0 < fp1/f < -0.6 \quad (3b)$$

Thus, each embodiment provides the cemented lens Lp1 in the first lens unit L1$a$ with a proper negative refractive power and moves the principal point position of the overall optical system OL to the image side, thereby maintaining a predetermined amount of back focus and reducing the size of the optical system.

In addition, each embodiment properly sets the refractive indices of both materials of the cemented lens Lp1, reduces the Petzval sum, and properly maintains the image plane characteristic. Moreover, each embodiment properly sets the Abbe numbers of both materials, and properly corrects the chromatic aberration and the spherical aberration.

In each embodiment, at least one of the following conditions may be satisfied. In each embodiment, focusing is made by moving the overall optical system. "BF" denotes a back focus in a focus upon an infinitely distant object of the optical system OL. "f1$a$" denotes a focal length of the first lens unit L1$a$. "Ltot" denotes an effective lens length of the optical system OL along the optical axis from the lens surface that is closest to the object and the lens surface that is closest to the image. The second lens unit L1$b$ includes, in order from the object side to the image side, a cemented lens Lp2 made by joining a negative fourth lens L21 and a positive fifth lens L22 with each other, and a positive sixth lens which has a meniscus shape.

Assume that the material of the fourth lens L21 has a refractive index n21 and an Abbe number vd21, and the material of the fifth lens L22 has a refractive index n22 and an Abbe number vd22. In addition, assume that the second lens L1$b$ has a focal length f1$b$, and the cemented lens Lp2 has a focal length fp2:

$$0.8 < BF/f < 1.5 \quad (4)$$

$$1.8 < f1a/f < 25.0 \quad (5)$$

$$0.50 < Ltot/BF < 0.72 \quad (6)$$

$$-0.10 < (n22-n21) < 0.15 \quad (7)$$

$$1.20 < (vd22/vd21) < 2.50 \quad (8)$$

$$1.00 < f1b/f < 1.40 \quad (9)$$

$$-5.00 < fp2/f < -0.20 \quad (10)$$

A description will now be given of a technical meaning of each conditional expression.

The conditional expression (4) relates to a back focus of the optical system OL. The conditional expression (4) normalizes the back focus using the focal length. When the back focus is set so as to satisfy the conditional expression (4), it is easier to reduce the size of the overall optical system. The range of the conditional expression (4) may be set as follows:

$$0.8 < BF/f < 1.4 \quad (4a)$$

The conditional expression (5) relates to a refractive power of the first lens unit L1$a$. The focal length of the first lens unit L1$a$ is normalized by dividing by it by the focal length of the entire optical system. Due to the standard angle of view as in the optical system OP of each embodiment, it is necessary to a predetermined amount of back focus for the optical system OL having a comparatively wider angle of view, and to reconcile the miniaturization and high performance of the optical system OL with each other. The conditional expression (5) relates to these points.

In the optical system OL of each embodiment, the first lens unit L1$a$ has a positive refractive index. As the positive refractive index becomes stronger, it becomes difficult to maintain a predetermined amount of back focus for the entire optical system and to obtain a high optical performance although the miniaturization of the optical system OL is facilitated. As the positive refractive power becomes weaker, it becomes easy to maintain a predetermined amount of back focus but it becomes difficult to reduce the size of the optical system and to obtain the high optical performance. As a result, the refractive power of the first lens unit L1$a$ may be set so as to satisfy the conditional expression (5).

If the value is lower than the lower limit in the conditional expression (5), the refractive power of the first lens unit L1$a$ becomes stronger (or the focal length becomes shorter), and it becomes difficult to reduce the size of the optical system and to obtain a high optical performance, as described above. If the value is higher than the upper limit in the conditional expression (5), the refractive power of the first lens unit L1$a$ becomes weaker (or the focal length becomes longer), and it becomes difficult to reduce the size of the optical system OL and to obtain a high optical performance, as described above. Thus, when the conditional expression (5) is satisfied, it becomes easy to realize a compact and high-performance optical system OL and to secure a predetermined amount of back focus. The range of the conditional expression (5) may be set as follows:

$$2.0 < f1a/f < 24.0 \quad (5a)$$

The range of the conditional expression (5a) may be set as follows:

$$2.2 < f1a/f < 23.0 \quad (5b)$$

The conditional expression (6) relates to a relationship between an effective lens length and a back focus in the optical system OL. If the value is lower than the lower limit in the conditional expression (6), the effective lens length becomes excessively small and it becomes difficult to properly maintain the optical performance. If the value is higher than the upper limit in the conditional expression (6), the effective lens length becomes excessively long and the entire optical system has a large size. The numerical range of the conditional expression (6) may be set as follows:

$$0.510 < Ltot/BF < 0.715 \tag{6a}$$

The conditional expressions (7) and (8) relate to the refractive indexes and Abbe numbers of the materials of the positive fifth lens and negative fourth lens in the cemented lens Lp2 in the second lens unit L1b. As expressed by the conditional expressions (7) and (8), a difference between the refractive index of the material of the positive fifth lens L22 and the refractive index of the material of the negative fourth lens L21 in the cemented lens Lp2 is maintained within the predetermined range, and a value of a ratio of the Abbe number is set within a predetermined range. Thereby, a correction of a spherical aberration for each color becomes facilitated in addition to corrections of a spherical aberration, a curvature of field, and a chromatic aberration at the fundamental wavelength.

If the value is lower than the lower limit in the conditional expression (7), the Petzval sum increases and the image plane characteristic deteriorates. If the value is higher than the upper limit in the conditional expression (7), the correction of the spherical aberration becomes difficult for each color. If the value is lower than the lower limit in the conditional expression (8), the Abbe number of the material of the positive fifth lens becomes excessively close to the high dispersion side, and the correction of the chromatic aberration becomes difficult. If the value is higher than the upper limit in the conditional expression (8), the Abbe number of the material of the positive $21^{nd}$ lens L21 becomes excessively close to the high dispersion side, and well-balanced corrections of the chromatic aberration and the curvature of field become difficult. The ranges of the conditional expressions (7) and (8) may be set as follows:

$$-0.08 < (n22-n21) < 0.14 \tag{7a}$$

$$1.40 < (vd22/vd21) < 2.10 \tag{8a}$$

The conditional expression (9) relates to a refractive power of the second lens unit L1b. The focal length of the second lens unit L1b is normalized by dividing it by the focal length of the entire optical system. As the refractive power of the second lens unit L1b becomes stronger (or the focal length becomes smaller), the astigmatism and the distortion deteriorate. In addition, the effective diameter of the back unit increases, and it becomes difficult to house it in the lens barrel having a predetermined outer diameter. On the other hand, as the refractive power of the second lens unit L1b becomes weaker (or the focal length is longer), the exit pupil position approaches to the image plane, and an incident angle upon the image plane of the off-axial light flux increases.

If the value is lower than the lower limit in the conditional expression (9), the refractive power of the second lens L1b becomes undesirably stronger (or the focal length becomes smaller), as described above. If the value is higher than the upper limit in the conditional expression (9), the refractive power of the second lens unit L1b becomes undesirably weaker (or the focal length becomes longer), as described above.

The conditional expression (10) relates to a synthetic refractive power of the cemented lens Lp2 in the second lens unit L1b. The focal length of the second lens unit L1b is normalized divided by it by the focal length of overall optical system. Corrections of a variety of aberrations, such as a coma, astigmatism, curvature of field, and distortion, become easier by setting the negative fourth lens L21 so that the refractive power of the cemented lens Lp2 can satisfy the conditional expression (10).

If the value is lower than the lower limit in the conditional expression (10), the refractive power of the cemented lens Lp2 becomes excessively weak (or the focal length becomes excessively long) and the corrections of the image plane characteristic and the distortion become difficult. If the value is higher than the upper limit in the conditional expression (10), the refractive power of the cemented lens Lp2 becomes excessively strong (or the focal length becomes excessively short) and a variety of aberrations deteriorate. The ranges of the conditional expressions (9) and (10) may be set as follows:

$$1.05 < f1b/f < 1.25 \tag{9a}$$

$$-4.60 < fp2/f < -0.80 \tag{10a}$$

In each embodiment, at least one lens surface has an aspheric shape in the positive sixth lens L23 which has a meniscus shape so as to facilitate the aberrational corrections.

Thus, each embodiment provides an optical system having a high optical performance in which a variety of aberrations, in particular the spherical aberration and the curvature of field, are properly corrected.

Next follows characteristics of an optical system according to each embodiment:

First Embodiment

A description will be given of the optical system OL according to the first embodiment illustrated in FIGS. 1A and 1B. The following values relating to the lengths mean the following numerical examples expressed in millimeters. The optical system OL according to the first embodiment has a focal length of 45.0 mm, and an image pickup angle of view 2ω of 51.4° (therefore half an angle of view ω is 25.7°). The optical system OL illustrated in FIG. 1A includes, in order from the object side to the image side, a first lens unit L1a of a positive refractive power having a synthetic focal length of 101.3 mm, an aperture diaphragm SP, and a second lens unit L1b of a positive refractive power having a synthetic focal length of 54.4 mm.

The first lens unit L1a includes, in order from the object side to the image side, a cemented lens Lp1 having a synthetic focal length of −300.0 mm made by joining the positive first lens (of a positive refractive power) L11 and the negative second lens (of a negative refractive power) L12 with each other, and the positive third lens L13 which has a meniscus shape. The second lens unit L1b includes, in order from the object side to the image side, a cemented lens Lp2 having a synthetic focal length of −49.8 mm made by joining a negative fourth lens L21 and a positive fifth lens L22 with each other, and a positive sixth lens L23 which has a meniscus shape. The lens surface on the object side of the positive sixth lens L23 has an aspheric shape.

In the optical system OL of this embodiment, the refractive index difference between the material of the positive first lens L11 and the material of the negative second lens L12 in the 1a lens unit L1a expressed by the conditional expression (1) is 0.215, and the material of the positive first lens is higher. The Abbe number ratio of the material expressed by the conditional expression (2) is 1.18. The ratio of the focal length between the cemented lens Lp1 and the entire optical system expressed by the conditional expression (3) is −6.67.

The thus configured optical system OL according to the first embodiment properly sets the refractive index difference and the Abbe number ratio between the material of the positive first lens L11 and the material of the negative second lens L12 in the 1a lens unit L1a. Thereby, this embodiment provides the negative second lens L12 with the proper refractive power, reduces the Petzval sum of the entire optical system, and properly maintains the image plane characteristic.

The back focus BF can maintain a value as long as 38.0 mm enough for a single-lens reflex camera having a quick return mirror, when the synthetic focal length of the cemented lens Lp1 is properly set. As a result, the effective lens length Ltot is as small as 20.0 mm but the optical system has a high optical performance in which a spherical aberration, a curvature of field, and a distortion are well-corrected as understood from the aberrational diagram of FIG. 1B.

Second Embodiment

A description will be given of the optical system OL according to the second embodiment illustrated in FIGS. 2A and 2B. The optical system OL according to the second embodiment has a focal length of 39.0 mm, and an image pickup angle of view 2ω of 58.0° (therefore half an angle of view ω is 29.0°). The optical system OL illustrated in FIG. 2A includes, in order from the object side to the image side, a first lens unit L1a of a positive refractive power having a synthetic focal length of 117.5 mm, an aperture diaphragm SP, and a second lens unit L1b of a positive refractive power having a synthetic focal length of 45.5 mm.

The first lens unit L1 a includes, in order from the object side to the image side, a cemented lens Lp1 having a synthetic focal length of −76.5 mm made by joining the positive first lens L11 and the negative second lens L12 with each other, and the positive third lens L13 having a meniscus shape.

The second lens unit L1b includes, in order from the object side to the image side, a cemented lens Lp2 having a synthetic focal length of −160.1 mm made by joining the negative fourth lens L21 and the positive fifth lens L22 with each other, and the positive sixth lens having a meniscus shape. The lens surface on the object side of the positive sixth lens L23 has an aspheric shape.

In the optical system OL of this embodiment, the refractive index difference between the material of the positive first lens L11 and the material of the negative second lens L12 in the 1a lens unit L1a expressed by the conditional expression (1) is 0.303, and the material of the positive first lens is higher. The Abbe number ratio of the material expressed by the conditional expression (2) is 0.88. The ratio of the focal length between the cemented lens Lp1 and the entire optical system expressed by the conditional expression (3) is −1.96.

The thus configured optical system OL according to the second embodiment properly sets the refractive index difference and the Abbe number ratio between the material of the positive first lens L11 and the material of the negative second lens L12 in the 1a lens unit L1a. Thereby, this embodiment provides the negative second lens L12 with the proper refractive power, reduces the Petzval sum of the entire optical system, and properly maintains the image plane characteristic. In addition, the back focus BF can maintain a value as long as 39.0 mm enough for a single-lens reflex camera having a quick return mirror, by properly setting the synthetic focal length of the cemented lens Lp1.

As a result, the effective lens length Ltot is as small as 23.5 mm but the optical system has a high optical performance in which a spherical aberration, a curvature of field, and a distortion are well corrected as understood from the aberrational diagram of FIG. 2B.

Third Embodiment

A description will be given of the optical system OL according to the third embodiment illustrated in FIGS. 3A and 3B. The optical system OL according to the third embodiment has a focal length of 35.0 mm, and an image pickup angle of view 2ω of 63.4° (therefore half an angle of view ω is 31.7°). The optical system OL illustrated in FIG. 3A includes, in order from the object side to the image side, a first lens unit L1a of a positive refractive power having a synthetic focal length of 130.3 mm, an aperture diaphragm SP, and a second lens unit L1b of a positive refractive power having a synthetic focal length of 38.1 mm.

The first lens unit L1a includes, in order from the object side to the image side, a cemented lens Lp1 having a synthetic focal length of −32.6 mm made by joining the positive first lens L11 and the negative second lens L12 with each other, and the positive third lens L13 having a meniscus shape. The second lens unit L1b includes, in order from the object side to the image side, a cemented lens Lp2 having a synthetic focal length of −31.3 mm made by joining the negative fourth lens L21 and the positive fifth lens L22 with each other, and the positive sixth lens L23 having a meniscus shape. The lens surface on the object side of the positive sixth lens L23 has an aspheric shape.

In the optical system OL of this embodiment, the refractive index difference between the material of the positive first lens L11 and the material of the negative second lens L12 in the 1a lens unit L1a expressed by the conditional expression (1) is 0.329, and the material of the positive first lens is higher. The Abbe number ratio of the material expressed by the conditional expression (2) is 0.66. The ratio of the focal length between the cemented lens Lp1 and the overall optical system expressed by the conditional expression (3) is −0.93.

The thus configured optical system OL according to the third embodiment properly sets the refractive index difference and the Abbe number ratio between the material of the positive first lens L11 and the material of the negative second lens L12 in the 1a lens unit L1a. Thereby, this embodiment provides the negative second lens L12 with the proper refractive power, reduces the Petzval sum of the entire optical system, and properly maintains the image plane characteristic. In addition, the back focus BF can maintain a value as long as 38.0 mm enough for a single-lens reflex camera having a quick return mirror, by properly setting the synthetic focal length of the cemented lens Lp1.

As a result, the effective lens length Ltot is as small as 25.0 mm but the optical system has a high optical performance in which a spherical aberration, a curvature of field, and a distortion are well corrected as understood from the aberrational diagram of FIG. 3B.

Fourth Embodiment

A description will be given of the optical system OL according to the fourth embodiment illustrated in FIGS. 4A and 4B. The optical system OL according to the fourth embodiment has a focal length of 28.0 mm, and an image pickup angle of view 2ω of 75.4° (therefore half an angle of view ω is 37.7°). The optical system OL illustrated in FIG. 4A includes, in order from the object side to the image side, a first lens unit L1a of a positive refractive power having a synthetic focal length of 626.2 mm, an aperture diaphragm SP, and a second lens unit L1b of a positive refractive power having a synthetic focal length of 33.3 mm.

The first lens unit L1a includes, in order from the object side to the image side, a cemented lens Lp1 having a synthetic focal length of −21.8 mm made by joining the positive first lens L11 and the negative second lens L12 with each other, and the positive third lens L13 having a meniscus shape. The second lens L1b unit includes, in order from the object side to the image side, a cemented lens Lp2 having a synthetic focal length of −37.8 mm made by joining the negative fourth lens L21 and the positive fifth lens L22, and the positive sixth lens L23 having a meniscus shape. The lens surface on the object side of the positive sixth lens L23 has an aspheric shape.

In the optical system OL of this embodiment, the refractive index difference between the material of the positive first lens L11 and the material of the negative second lens L12 in the 1a lens unit L1a expressed by the conditional expression (1) is 0.075, and the material of the positive first lens is higher. The Abbe number ratio of the material expressed by the conditional expression (2) is 0.85. The ratio of the focal length between the cemented lens Lp1 and the overall optical system expressed by the conditional expression (3) is −0.78.

The thus configured optical system OL according to the fourth embodiment properly sets the refractive index difference and the Abbe number ratio between the material of the positive first lens L11 and the material of the negative second lens L12 in the 1a lens unit L1a. Thereby, this embodiment provides the negative second lens L12 with the proper refractive power, reduces the Petzval sum of the entire optical system, and properly maintains the image plane characteristic. In addition, the back focus BF can maintain a value as long as 38.0 mm enough for a single-lens reflex camera having a quick return mirror, by properly setting the synthetic focal length of the cemented lens Lp1.

As a result, the effective lens length Ltot is as small as 27.0 mm but the optical system has a high optical performance in which a spherical aberration, a curvature of field, and a distortion are well corrected as understood from the aberrational diagram of FIG. 4B.

FIG. 5 illustrates a schematic view of principal part of a single-lens reflex camera. In FIG. 5, reference numeral 10 denotes an image pickup optical system including the optical system 1 according to any one of the first to fourth embodiments.

The image pickup optical system 1 is held by a lens barrel 2 that serves as a holder. Reference numeral 20 denotes a camera body. The camera body 20 includes a quick return mirror 3, a focus plate 4, a pentagonal dach prism 5, an eyepiece 6, etc. The quick return mirror 3 upwardly reflects a light flux from the image pickup optical system 10. The focus plate 4 is arranged on the imaging position of the image pickup optical system 10. The pentagonal dach mirror 5 converts an inverse image into an erect image. An observer observes the erect image through the eyepiece 6.

Reference numeral 7 denotes a photosensitive surface, on which an image sensor (photosensitive conversion element), such as a CCD sensor and a CMOS sensor, configured to receive light, or a film is arranged. In the image pickup, the quick return mirror retreats from the optical path, and the image is formed on the photosensitive surface by the image pickup optical system 10.

Thus, an optical apparatus has a high optical performance when the optical system of this embodiment is applied to the image pickup apparatus, such as a single-lens reflex camera. The optical system of this embodiment is applicable to other optical apparatuses, such as a digital camera, a video camera, a film-based camera, a telescope, a microscope, a copier, a projector, and a mirror-less camera.

Hence, each embodiment provides a compact and high performance optical apparatus having an image pickup angle of view from 50° to 80° and well-corrected aberrations, in particular the spherical aberration and the curvature of field.

Next follows specific numerical values data of the optical systems according to the first to fourth embodiments. "i" denotes an order counted from the object side. The surface number "i" is counted from the object side in order. "Ri" is a radius of curvature (mm) of the i-th surface, and "Di" is an interval (separation) (mm) between the i-th surface and the i+1-th surface. "Ndi" and "vdi" are the refractive index of the d-line and the Abbe number of a medium between the i-th surface and the i+1-th surface. "BF" is a back focus, and the effective lens length represents a distance from the first lens surface to the final lens surface. Data of the second lens unit L1b is expressed in a state in which the aperture diaphragm SP is inserted.

The aspheric surface is expressed by an asterisk * added to the surface number. The aspheric shape is expressed by the following expression:

$$x(h) = \frac{(1/r)h^2}{1 + \sqrt{\{1-(1+K)(h/r)^2\}}} + Bh^4 + Ch^6 + Dh^8 + Eh^{10} \ldots$$

Herein, "X" is a variation amount from a surface vertex in the optical axis direction, "h" is a height from the optical axis in a direction perpendicular to the optical axis, and "r" is a paraxial radius of curvature. "K" denotes a conic constant. "B," "C," "D," "E," ... are aspheric coefficients of each order. [E±XX] in each aspheric constant denotes [×10$^{±xx}$]. Table 1 illustrates numerical values relating to each conditional expression. Table 2 illustrates numerical values corresponding to each conditional expression.

NUMERICAL EXAMPLE 1

Unit mm

| surface number | R | D | Nd | vd | effective ray diameter |
|---|---|---|---|---|---|
| 1 | 20.432 | 3.44 | 1.83481 | 42.7 | 18.66 |
| 2 | 209.304 | 1.20 | 1.62004 | 36.3 | 17.29 |
| 3 | 12.815 | 0.44 | | | 14.90 |
| 4 | 14.204 | 2.39 | 1.83481 | 42.7 | 14.94 |
| 5 | 17.605 | 2.83 | | | 14.19 |
| 6 (diaphragm) | ∞ | 3.35 | | | 12.95 |
| 7 | −14.284 | 1.00 | 1.72825 | 28.5 | 14.02 |
| 8 | 456.136 | 2.28 | 1.83481 | 42.7 | 15.26 |
| 9 | −29.737 | 0.32 | | | 15.72 |
| 10 | −105.914 | 2.75 | 1.83481 | 42.7 | 16.01 |
| 11* | −20.244 | 37.99 | | | 16.31 |
| image plane | ∞ | | | | | aspheric surface data

| | conic constant K | fourth constant B | sixth constant C |
|---|---|---|---|
| 11$^{th}$ surface | 0.0000E+00 | 1.1494E−05 | −4.6190E−08 |
| | eighth constant D | tenth constant E | twelfth constant F |
| 11$^{th}$ surface | 1.2748E−09 | −2.1883E−11 | 1.4551E−13 | various data

| | |
|---|---|
| focal length | 45.00 |
| Fno | 2.80 |
| ω | 25.68 |
| image height | 21.64 |
| effective lens length | 20.00 |
| overall lens length | 57.99 |
| BF | 37.99 |

-continued

| Unit mm | |
|---|---|
| incident pupil position | 9.46 |
| exit pupil position | −9.78 |
| front principal point position | 12.08 |
| back principal point position | −7.01 | unit data

| unit | starting surface | focal length | effective lens length | front principal point position | back principal point position |
|---|---|---|---|---|---|
| 1 | 1 | 101.29 | 7.47 | −15.36 | −17.11 |
| 2 | 6 | 54.44 | 9.7 | 13.26 | 7.74 | single lens data

| lens | starting surface | focal length |
|---|---|---|
| 1 | 1 | 26.900 |
| 2 | 2 | −22.070 |
| 3 | 4 | 66.750 |
| 4 | 7 | −19.000 |
| 5 | 8 | 33.510 |
| 6 | 10 | 29.550 | cemented lens data

| lens | starting surface | focal length |
|---|---|---|
| 1 | 1 | −300.000 |
| 2 | 7 | −49.826 |

NUMERICAL EXAMPLE 2

| Unit mm | | | | | |
|---|---|---|---|---|---|
| surface number | R | D | Nd | vd | effective ray diameter |
| 1 | 38.185 | 3.07 | 1.83481 | 42.7 | 18.64 |
| 2 | −93.918 | 1.20 | 1.53172 | 48.8 | 17.40 |
| 3 | 13.191 | 2.20 | | | 13.62 |
| 4 | 15.211 | 2.01 | 1.69680 | 55.5 | 13.34 |
| 5 | 28.380 | 2.33 | | | 13.02 |
| 6 (diaphragm) | ∞ | 5.12 | | | 12.84 |
| 7 | −11.637 | 1.00 | 1.69895 | 30.1 | 12.47 |
| 8 | 132.356 | 3.35 | 1.83481 | 42.7 | 13.78 |
| 9 | −18.087 | 0.15 | | | 14.44 |
| 10* | −39.511 | 3.08 | 1.58313 | 59.4 | 15.17 |
| 11 | −15.371 | 39.00 | | | 16.50 |
| image plane | ∞ | | | | | aspheric surface data

| | conic constant K | fourth constant B | sixth constant C |
|---|---|---|---|
| 10th surface | 0.0000E+00 | −3.4255E−05 | 4.6012E−08 |
| | eighth constant D | tenth constant E | twelfth constant F |
| 10th surface | −2.0635E−09 | 1.3485E−11 | 0.0000E+00 | various data

| focal length | 39.00 |
|---|---|
| Fno | 2.80 |
| ω | 29.02 |
| image height | 21.64 |
| effective lens length | 23.50 |
| overall lens length | 62.50 |

-continued

| Unit mm | |
|---|---|
| BF | 39.00 |
| incident pupil position | 9.01 |
| exit pupil position | −16.10 |
| front principal point position | 20.40 |
| back principal point position | 0.00 | unit data

| unit | starting surface | focal length | effective lens length | front principal point position | back principal point position |
|---|---|---|---|---|---|
| 1 | 1 | 117.49 | 8.47 | −1.81 | −7.58 |
| 2 | 6 | 45.5 | 12.7 | 16.01 | 8.6 | single lens data

| lens | starting surface | focal length |
|---|---|---|
| 1 | 1 | 32.870 |
| 2 | 2 | −21.670 |
| 3 | 4 | 44.280 |
| 4 | 7 | −15.260 |
| 5 | 8 | 19.260 |
| 6 | 10 | 41.210 | cemented lens data

| lens | starting surface | focal length |
|---|---|---|
| 1 | 1 | −76.465 |
| 2 | 7 | −160.098 |

NUMERICAL EXAMPLE 3

| Unit mm | | | | | |
|---|---|---|---|---|---|
| surface number | R | D | Nd | vd | effective ray diameter |
| 1 | 31.110 | 2.71 | 1.81600 | 46.6 | 20.00 |
| 2 | 64.750 | 1.20 | 1.48749 | 70.2 | 18.32 |
| 3* | 8.834 | 1.58 | | | 13.99 |
| 4 | 10.683 | 5.01 | 1.51823 | 58.9 | 13.36 |
| 5 | 49.751 | 2.23 | | | 11.83 |
| 6 (diaphragm) | ∞ | 4.32 | | | 11.58 |
| 7 | −10.553 | 2.22 | 1.84666 | 23.8 | 11.31 |
| 8 | −31.837 | 1.82 | 1.77250 | 49.6 | 12.90 |
| 9 | −19.871 | 0.35 | | | 13.54 |
| 10 | −127.701 | 3.57 | 1.77250 | 49.6 | 15.60 |
| 11* | −14.960 | 38.01 | | | 16.82 |
| image plane | ∞ | | | | | aspheric surface data

| | conic constant K | fourth constant B | sixth constant C |
|---|---|---|---|
| 3rd surface | 0.0000E+00 | −9.3583E−05 | 2.6056E−06 |
| | eighth constant D | tenth constant E | twelfth constant F |
| 3rd surface | −1.2162E−07 | 1.9474E−09 | −1.5434E−11 |
| | conic constant K | fourth constant B | sixth constant C |
| 11th surface | 0.0000E+00 | 4.2878E−05 | −7.3591E−07 |
| | eighth constant D | tenth constant E | twelfth constant F |
| 11th surface | 2.1396E−08 | −2.4980E−10 | 1.1415E−12 |

-continued

| Unit mm | |
|---|---|
| various data | |
| focal length | 35.00 |
| Fno | 2.80 |
| ω | 31.72 |
| image height | 21.64 |
| effective lens length | 25.00 |
| overall lens length | 63.01 |
| BF | 38.01 |
| incident pupil position | 10.29 |
| exit pupil position | −16.86 |
| front principal point position | 22.96 |
| back principal point position | 3.01 | unit data

| unit | starting surface | focal length | effective lens length | front principal point position | back principal point position |
|---|---|---|---|---|---|
| 1 | 1 | 130.29 | 10.5 | −1.42 | −8.51 |
| 2 | 6 | 38.11 | 12.27 | 15.8 | 10.14 | single lens data

| lens | starting surface | focal length |
|---|---|---|
| 1 | 1 | 70.810 |
| 2 | 2 | −21.130 |
| 3 | 4 | 25.150 |
| 4 | 7 | −19.580 |
| 5 | 8 | 64.190 |
| 6 | 10 | 21.640 | cemented lens data

| lens | starting surface | focal length |
|---|---|---|
| 1 | 1 | −32.559 |
| 2 | 7 | −31.298 |

NUMERICAL EXAMPLE 4

| Unit mm | | | | | |
|---|---|---|---|---|---|
| surface number | R | D | Nd | vd | effective ray diameter |
| 1 | 23.016 | 2.10 | 1.80400 | 46.6 | 20.00 |
| 2 | 31.381 | 1.20 | 1.72916 | 54.7 | 19.83 |
| 3* | 8.695 | 5.15 | | | 14.40 |
| 4 | 12.971 | 2.69 | 1.57501 | 41.5 | 12.88 |
| 5 | 148.422 | 4.15 | | | 12.35 |
| 6 (diaphragm) | ∞ | 5.11 | | | 12.12 |
| 7 | −11.338 | 1.00 | 1.84666 | 23.8 | 11.92 |
| 8 | −38.142 | 2.02 | 1.77250 | 49.6 | 13.02 |
| 9 | −18.778 | 0.15 | | | 13.69 |
| 10 | −236.118 | 3.42 | 1.69350 | 53.2 | 14.47 |
| 11* | −13.763 | 38.00 | | | 15.62 |
| image plane | ∞ | | | | | aspheric surface data

| | conic constant K | fourth constant B | sixth constant C |
|---|---|---|---|
| 3rd surface | 0.0000E+00 | −5.0785E−05 | −1.1153E−06 |
| | eighth constant D | tenth constant E | twelfth constant F |
| 3rd surface | −1.4349E−08 | 5.4826E−10 | −9.8501E−12 |
| | conic constant K | fourth constant B | sixth constant C |
| 11th surface | 0.0000E+00 | 4.9467E−05 | −8.6411E−08 |
| | eighth constant D | tenth constant E | twelfth constant F |
| 11th surface | 1.3298E−08 | −2.1686E−10 | 1.3404E−12 | various data

| focal length | 28.00 |
|---|---|
| Fno | 2.80 |
| ω | 37.69 |
| image height | 21.64 |
| effective lens length | 27.00 |
| overall lens length | 65.00 |
| BF | 38.00 |
| incident pupil position | 11.02 |
| exit pupil position | −16.44 |
| front principal point position | 24.62 |
| back principal point position | 10.00 | unit data

| unit | starting surface | focal length | effective lens length | front principal point position | back principal point position |
|---|---|---|---|---|---|
| 1 | 1 | 626.17 | 11.15 | 95.6 | 101.95 |
| 2 | 6 | 33.26 | 11.7 | 13.48 | 6.23 | single lens data

| lens | starting surface | focal length |
|---|---|---|
| 1 | 1 | 96.590 |
| 2 | 2 | −16.870 |
| 3 | 4 | 24.540 |
| 4 | 7 | −19.390 |
| 5 | 8 | 45.800 |
| 6 | 10 | 20.940 | cemented lens data

| lens | starting surface | focal length |
|---|---|---|
| 1 | 1 | −21.783 |
| 2 | 7 | −37.814 |

TABLE 1

| | FIRST EMBODIMENT | SECOND EMBODIMENT | THIRD EMBODIMENT | FOURTH EMBODIMENT |
|---|---|---|---|---|
| n11 | 1.83481 | 1.83481 | 1.81600 | 1.80400 |
| n12 | 1.62004 | 1.53172 | 1.48749 | 1.72916 |
| n21 | 1.72825 | 1.69895 | 1.84666 | 1.84666 |
| n22 | 1.83481 | 1.83481 | 1.77250 | 1.77250 |
| v11 | 42.7 | 42.7 | 46.6 | 46.6 |
| v12 | 36.3 | 48.8 | 70.2 | 54.7 |
| v21 | 28.5 | 30.1 | 23.8 | 23.8 |
| v22 | 42.7 | 42.7 | 49.6 | 49.6 |
| f | 45.0 | 39.0 | 35.0 | 28.0 |
| ω | 25.7 | 29.0 | 31.7 | 37.7 |
| f1a | 101.3 | 117.5 | 130.3 | 626.2 |
| f1b | 54.4 | 45.5 | 38.1 | 33.3 |
| fp1 | −300.0 | −76.5 | −32.6 | −21.8 |
| fp2 | −49.8 | −160.1 | −31.3 | −37.8 |
| Bf | 38.0 | 39.0 | 38.0 | 38.0 |
| Ltot | 20.0 | 23.5 | 25.0 | 27.0 |

TABLE 2

| | conditional expression | FIRST EMBODIMENT | SECOND EMBODIMENT | THIRD EMBODIMENT | FOURTH EMBODIMENT |
|---|---|---|---|---|---|
| (1) | n11-n12 | 0.215 | 0.303 | 0.329 | 0.075 |
| (2) | vd11/vd12 | 1.18 | 0.88 | 0.66 | 0.85 |
| (3) | fp1/f | −6.67 | −1.96 | −0.93 | −0.78 |
| (4) | BF/f | 0.84 | 1.00 | 1.09 | 1.36 |
| (5) | f1a/f | 2.25 | 3.01 | 3.72 | 22.36 |
| (6) | Ltot/BF | 0.53 | 0.60 | 0.66 | 0.71 |
| (7) | n21-n22 | 0.107 | 0.136 | −0.074 | −0.074 |
| (8) | vd22/vd21 | 1.50 | 1.42 | 2.08 | 2.08 |
| (9) | f1b/f | 1.21 | 1.17 | 1.09 | 1.19 |
| (10) | fp2/f | −1.11 | −4.11 | −0.89 | −1.35 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-288116, filed Dec. 28, 2011, which is hereby incorporated by reference herein in its entirety.

What is claimed is:

1. An optical system comprising, in order from an object side to an image side, a first lens unit of a positive refractive power, an aperture diaphragm, and a second lens unit of a positive refractive power, wherein the first lens unit includes, in order from the object side to the image side, a cemented lens Lp1 made by joining a first lens of a positive refractive power and a second lens of a negative refractive power with each other, and a third lens of a positive refractive power which has a meniscus shape, wherein the following conditional expressions are satisfied:

$0.030 < (n11 - n12)$ $0.20 < (vd11/vd12) < 1.30$ $-10.0 < fp1/f < -0.2$ where n11 and vd11 are a refractive index and an Abbe number of a material of the first lens, n12 and vd12 are a refractive index and an Abbe number of a material of the second lens, fp1 is a focal length of the cemented lens Lp1, and f is a focal length of an entire optical system.

2. The optical system according to claim 1, wherein the following conditional expression is satisfied:

$0.8 < BF/f < 1.5$ where BF is a back focus in a focus upon an infinitely distant object of the optical system.

3. The optical system according to claim 1, wherein the following conditional expression is satisfied:

$1.8 < f1a/f < 25.0$ where f1a is a focal length of the first lens unit.

4. The optical system according to claim 1, wherein the following conditional expression is satisfied:

$0.50 < Ltot/BF < 0.72$ where BF is a back focus in a focus upon an infinitely distant object of the optical system, and Ltot is an effective lens length of the optical system.

5. The optical system according to claim 1, wherein the second lens unit includes, in order from the object side to the image side, a cemented lens Lp2 made by joining a fourth lens of a negative refractive power and a fifth lens of a positive refractive power with each other, and a sixth lens of a positive refractive power which has a meniscus shape.

6. The optical system according to claim 5, wherein the following expressions are satisfied:

$-0.10 < (n22 - n21) < 0.15$ $1.20 < (vd22/vd21) < 2.50$ where n21 and vd21 are a refractive index and an Abbe number of a material of the fourth lens, and n22 and vd22 are a refractive index and an Abbe number of a material of the fifth lens.

7. The optical system according to claim 5, wherein the following expressions are satisfied:

$1.00 < f1b/f < 1.40$ $-5.00 < fp2/f < -0.20$ where f1b is a focal length of the second lens unit, and fp2 is a focal length of the cemented lens unit Lp2.

8. An optical system according to claim 1, forming an image on a photoelectric conversion element.

9. An optical apparatus comprising:

an optical system; and a photoelectric conversion element configured to receive light of an image formed by the optical system, wherein the optical system includes, in order from an object side to an image side, a first lens unit of a positive refractive power, an aperture diaphragm, and a second lens unit of a positive refractive power, wherein the first lens unit includes, in order from the object side to the image side, a cemented lens Lp1 made by joining a first lens of a positive refractive power and a second lens of a negative refractive power with each other, and a third lens of a positive refractive power which has a meniscus shape, wherein the following conditional expressions are satisfied:

$0.030 < (n11 - n12)$ $0.20 < (vd11/vd12) < 1.30$ $-10.0 < fp1/f < -0.2$ where n11 and vd11 are a refractive index and an Abbe number of a material of the first lens, n12 and vd12 are a refractive index and an Abbe number of a material of the second lens, fp1 is a focal length of the cemented lens Lp1, and f is a focal length of an entire optical system.

* * * * *